US012618215B2

(12) United States Patent
De Roo et al.

(10) Patent No.: US 12,618,215 B2
(45) Date of Patent: May 5, 2026

(54) VIBRATION DEVICE WITH BASE FRAME AND METHOD FOR INSERTING INTO THE GROUND OR REMOVING FROM THE GROUND A FOUNDATION ELEMENT BY PROVIDING SAID VIBRATION DEVICE

(71) Applicant: CAPE HOLLAND HOLDING B.V., Beilen (NL)

(72) Inventors: Hendrik Cejus De Roo, Beilen (NL); Laurens De Neef, Beilen (NL)

(73) Assignee: CAPE HOLLAND HOLDING B.V., Beilen (NL)

( * ) Notice: Subject to any disclaimer, the term of this patent is extended or adjusted under 35 U.S.C. 154(b) by 62 days.

(21) Appl. No.: 18/711,021

(22) PCT Filed: Nov. 17, 2022

(86) PCT No.: PCT/NL2022/050659
§ 371 (c)(1),
(2) Date: May 16, 2024

(87) PCT Pub. No.: WO2023/091010
PCT Pub. Date: May 25, 2023

(65) Prior Publication Data
US 2025/0012031 A1    Jan. 9, 2025

(30) Foreign Application Priority Data

Nov. 17, 2021    (NL) ..................................... 2029798

(51) Int. Cl.
*E02D 7/18*        (2006.01)
*B66C 23/52*       (2006.01)
*F03D 13/10*       (2016.01)

(52) U.S. Cl.
CPC ................. *E02D 7/18* (2013.01); *B66C 23/52* (2013.01); *F03D 13/126* (2023.08)

(58) Field of Classification Search
CPC .......... E02D 7/18; F03D 13/126; B66C 23/52
See application file for complete search history.

(56) References Cited

U.S. PATENT DOCUMENTS 10,011,970 B2    7/2018  DeNeef

FOREIGN PATENT DOCUMENTS

| CN | 213476877 U | 6/2021 | |
| JP | S5664024 A | 6/1981 | |
| JP | 5483739 B2 | 5/2014 | |
| KR | 101122194 B1 | 3/2012 | |
| NL | 2007546 C2 * | 4/2013 | ............ E02D 11/00 |
| NL | 20166464 A | 10/2017 | |

OTHER PUBLICATIONS

International Search Report and Written Opinion for Application No. PCT/NL2022/050659 dated Feb. 14, 2023.

* cited by examiner

*Primary Examiner* — Kyle Armstrong
(74) *Attorney, Agent, or Firm* — KDW Firm PLLC

(57)            ABSTRACT

A vibration device for inserting a foundation element into the ground includes a base frame having an inner space, and one or more vibration elements that are connected to the base frame. During use, the base frame extends at least partly around a side wall of the foundation element to at least partially enclose said foundation element in the inner space. A vibration system, a vibration assembly and a method for inserting a foundation element into the ground.

18 Claims, 7 Drawing Sheets

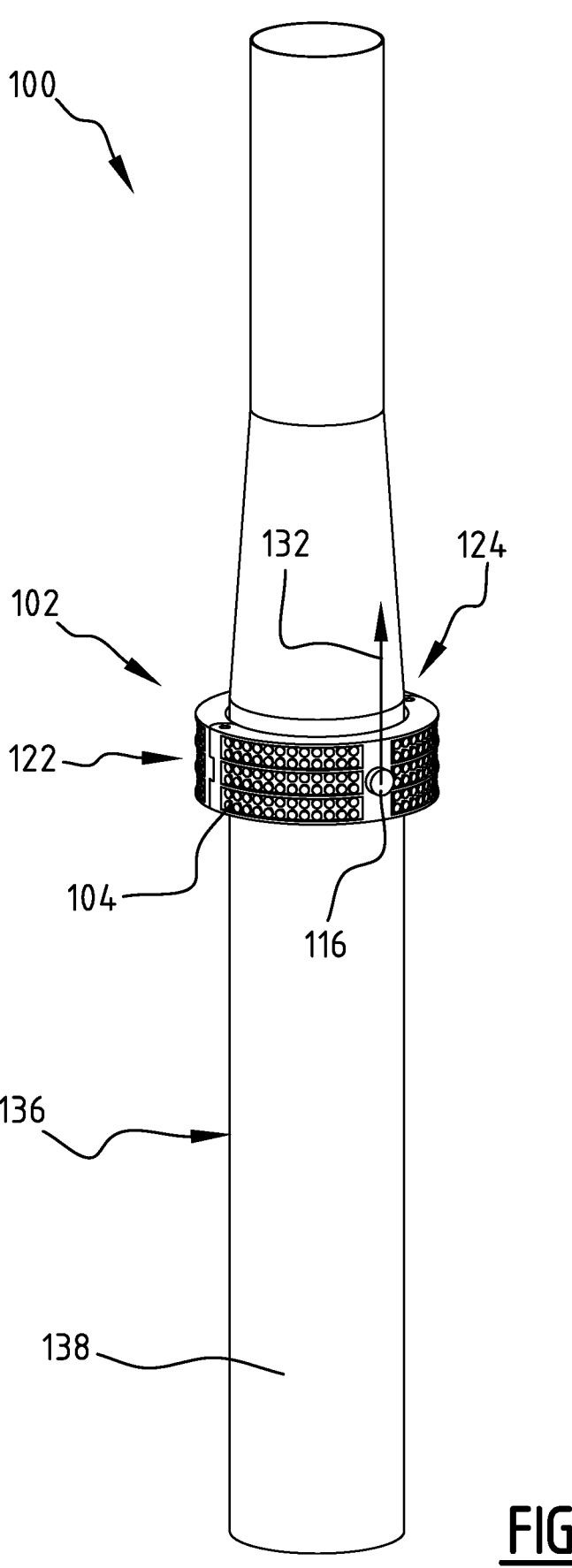
<u>FIG. 5</u>

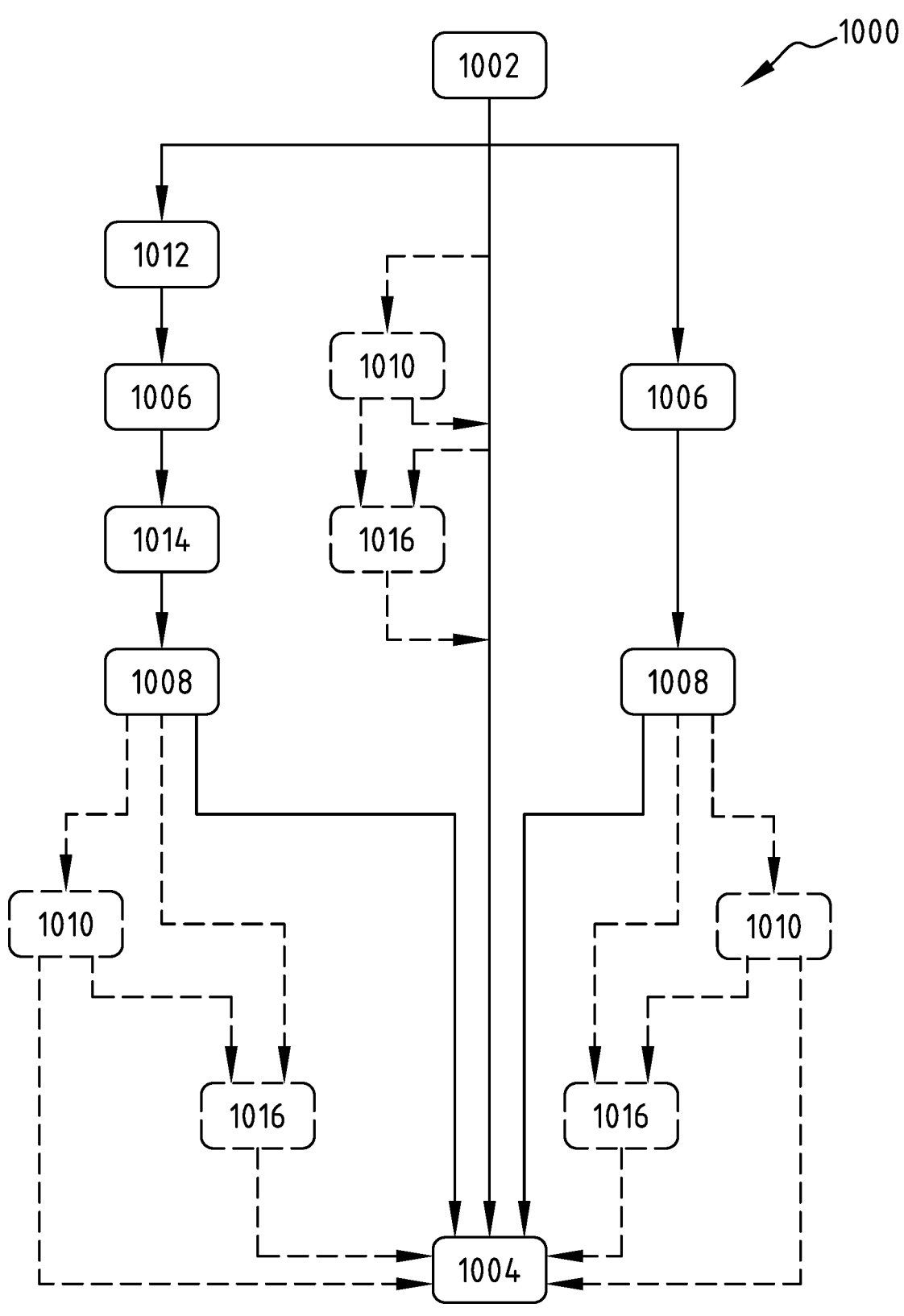
<u>FIG. 8</u>

VIBRATION DEVICE WITH BASE FRAME AND METHOD FOR INSERTING INTO THE GROUND OR REMOVING FROM THE GROUND A FOUNDATION ELEMENT BY PROVIDING SAID VIBRATION DEVICE

This is a national stage application filed under 35 U.S.C. § 371 of pending international application PCT/NL2022/050659, filed Nov. 17, 2022, which claims priority to Netherlands Patent Application No. 2029798, filed Nov. 17, 2021, the entirety of which applications are hereby incorporated by reference herein.

The invention relates to a vibration device and a method for inserting a foundation element into the seabed or into the ground. The vibration device and method are useable for both land-based and sea-based foundation elements. The invention also relates to a vibration system and a vibration assembly comprising such vibration device.

Vibration devices for placing or inserting foundation elements, such as foundation piles, into the ground are known. Such devices are for example used in the placement of foundations for wind turbines. The known vibration devices drive the foundation element, such as a solid or hollow foundation pile, into the ground using vibrations. To that end, the known vibration devices comprise at least one vibration block that is connected to the upper side of the foundation pile.

A disadvantage is that, especially when the vibration device is connected after upending the element—that is putting it in a vertical, upright position—the chance of inaccuracies and therewith an incorrect connection are high.

To alleviate this disadvantage, the vibration device can be connected to the element before upending it, that is when the foundation element is in a substantially horizontal position. This increases accuracy and reduces the risk of an incorrect connection.

This solution however brings about the disadvantage that great forces are exerted on the foundation element and the vibration device during upending thereof. This reduces the life-time of the vibration device. Especially components such as resilient elements of the vibration device are subject to high varying forces that may lead to unexpected breaking during hoisting and/or positioning. To prevent such damage or failure, an increase in maintenance is required.

To alleviate that particular disadvantage, EP 3 155 176 discloses a vibration device that comprises inter alia a fixation mechanism to fixate the resilient elements during hoisting and/or positioning to prevent damage thereto.

A disadvantage of all these known devices, especially the larger and heavier ones, is that hoisting and positioning also exerts large forces on the foundation element to be placed. In many cases, especially when a coating is applied to the foundation element or when the foundation element has preinstalled connectors, this may lead to damage of the foundation element.

Therefore, there is a need for an improved vibration device in which damage to the foundation element is obviated or at least reduced. To that end, the invention provides a vibration device for inserting a foundation element into the ground, the device comprising:

a base frame having an inner space;
one or more vibration elements that are connected to the base frame;
wherein, during use, the base frame extends at least partly around a side wall of the foundation element to enclose said foundation element in the inner space.

The vibration device according to the invention is designed to be positioned at least partly around the side wall of the foundation element, such that the foundation element extends through the inner space. Preferably, the vibration device extends around the entire circumference of the foundation element.

An advantage of the device according to the invention is that it, due to its positioning around the side wall of the foundation element, prevents the end portion, which generally is the portion not driven into the ground, such as a top or upper portion, of the foundation element to get damaged during hoisting, positioning and inserting the foundation element. This increases the life-time or lifespan of the foundation element.

This is especially true for coated foundation elements. At present, on most foundation elements a coating is provided onto the upper end of the foundation element to prevent damage, such as weather damage. This part is often the part that extends at or above water level (in marine environments) or the part extending above ground level (in land-based foundation elements). The device according to the invention can be placed at a position on the foundation element that is uncoated, which substantially obviates the issue of damage thereto. This is not possible with existing devices.

Another advantage of the vibration device according to the invention is that the emission of noise is significantly reduced compared to the known devices. This is first of all due to the fact that the device can be placed about halfway of the length of the foundation element. This significantly reduces resonance in the element during insertion, in turn reducing overall noise emission.

Secondly, the device according to the invention can advantageously be used to induce torsional vibration, axial vibration or both to insert the foundation element. Especially the use of torsional vibration reduces the amount of noise emitted during insertion of the foundation element. This becomes possible by the fact that the device is positioned substantially around (and preferably about halfway of) the foundation element.

A further advantage of the vibration device according to the invention is that, by positioning (and clamping) the device around the circumference (i.e. the side wall) of the foundation element, an increased lifting height can be achieved and/or larger foundation elements can be lifted without having to increase the size of the lifting crane. It is generally known to lift a foundation element by a crane attached to the vibration device. Additionally, by clamping the device around the circumference and not at one of the outer ends, the overall length of the assembly of foundation element and vibrating device is reduced.

In current practice, the known device is connected to the foundation element at a first or top end, whereas the crane is generally positioned near the opposite, lower end of the foundation element or, at the most, near the longitudinal middle of the foundation element. As a result, the distance between the device and the crane is relatively high, therewith restricting the maximum lifting height.

An advantage of the device according to the invention is that it is positioned relatively close near the crane, which reduces the distance between them and thus allows higher lifting, a lower crane, lifting of a larger foundation element or a combination thereof.

A further advantage of the abovementioned reduced distance is that any cables, hoses and the like that are connected to the device can be shorter than with the known devices as well.

An even further advantage of the vibration device according to the invention is that it can be attached to the foundation element on the deck of a ship (thus with relative ease). Due to the connection position of the known devices at the (top) end of the foundation element, which is often positioned outboard of the ship carrying the foundation element, this is more difficult, if not impossible, with the known devices. This reduces handling risk and/or connection failure and/or increases time and effort.

An even further advantage of the vibration device according to the invention is that, especially when removing a foundation element from the seabed or the ground, the device according to the invention is positioned relatively close to the seabed or the ground, when compared to the known devices. As a result, the vibrations that are induced by the vibration device are transferred to the foundation element at a point close to the seabed or ground and are thus more effectively applied. It is noted that the terms longitudinal center of the foundation element, the middle of the foundation element, the middle part of the foundation element and/or halfway the foundation element are used interchangeably in this disclosure and are all directed to a part of the foundation element that is positioned in between both ends (and excludes both ends of the foundation elements).

In an embodiment according to the invention, the vibration device is configured, when viewed along a length direction of a foundation element, to be positioned at or on a (longitudinal) middle part of the foundation element.

Although the vibration device, due to the fact it is placed around the foundation element, can be placed at virtually any place along the length of the foundation element, it is preferred to position it on a middle part thereof. An advantage of doing so is that it is positioned near the center of gravity of the element, which provides increased control over its movement.

Preferably, the vibration device is, when viewed along the length of the foundation element, positioned slightly above the center of gravity towards the top end of the foundation element to even further increase ease of handling during upending, positioning and inserting.

Moreover, an advantage is that, in case it is found that the ground conditions are very difficult and additional force to insert the foundation element is required, additional tools can still be attached to the (top or upper) end of the foundation element. This improves flexibility and provides additional options, especially in difficult operations.

The base frame can be one frame. However, the base frame may also comprise two or more segments.

In an embodiment according to the invention, the base frame has a central axis and, during use, the central axis of the base frame and a central axis of the foundation element extend substantially collinear with each other.

An advantage of lining up the central axis of the foundation element with the central axis of the base frame is that the weight distribution of the base frame around the foundation element is substantially constant. As a result, upending the foundation element using a crane, becomes easier due to the increased stability of the assembly of device and foundation element.

In an embodiment according to the invention, the base frame may have an inner wall that delineates the inner space, and wherein the inner wall, during use, extends parallel to, preferably contiguous with, the side wall of the foundation element.

An advantage of having the device inner wall and the foundation element side wall extend parallel to, adjacent to, or preferably contiguous with, each other is the improvement of the grip of the device on the foundation element and that it allows a more efficient transfer of forces from the at least one vibration element to the foundation element due to the direct physical contact between the vibration device according to the invention and the side wall of the foundation element that is to be inserted. It is noted that a similar reasoning is also valid for extracting a foundation element from the ground or seabed.

In an elaboration, the inner wall may comprise or be a gripping or clamping surface.

Optionally, moving the inner wall to the foundation element can (also) be realized by reducing the circumference of the base frame (segments), for example by reducing the distance between all or some of the segments.

In an embodiment according to the invention, the inner space may be substantially cylindrical.

An advantage of a substantially cylindrical inner space is that is generally conforms to the side wall or outer wall of the foundation element. As a result, the device according to the invention provides an improved grip and, therewith, improved handling.

Another advantage is that a more efficient transfer of forces from the at least one vibration element to the foundation element is realized due to the direct physical contact between the vibration device according to the invention and the side wall of the foundation element that is to be inserted. It is noted that a similar reasoning is also valid for extracting a foundation element from the ground or seabed.

In an embodiment according to the invention, the base frame has an outer wall that is positioned radially outwards from the inner wall, wherein the at least one vibration element is positioned on the outer wall or in the base frame between the inner and the outer wall.

The at least one vibration element is preferably positioned as close to the foundation element as possible. This means that the at least one vibration element may be positioned on an outer wall of the vibration device. Alternatively, the at least one vibration element may be positioned in the base frame of the vibration device and/or be substantially enclosed in the base frame. In this alternative, the base frame is provided with an outer wall that is, when viewed from a central point in the inner space, positioned radially outward from the inner wall.

This embodiment provides several advantages. A first advantage is that, due to the proximity of and/or the direct contact between the at least one vibration element and the foundation element, a more efficient transfer of forces is realized.

A second advantage is that the transfer of forces does not require any additional bearings, transfer components and the like. This not only further increases efficiency, it also reduces maintenance requirements and increases the operational life-time of the device according to the invention.

A third advantage is that, especially when the at least one vibration element is enclosed in the base frame, the at least one vibration element is shielded from external influences and therefore has an increased life-time or lifespan and a reduced maintenance requirement.

It is noted that a similar reasoning is also valid for extracting a foundation element from the ground or seabed.

In an embodiment according to the invention, the base frame may have an open position and a closed position, wherein, in the open position, the device is positionable around the foundation element, and wherein, in the closed position, the foundation element is clamped in the inner space of the base frame.

An advantage of providing a base frame that can be opened and closed allows the device to be positioned in an easy and straightforward manner around the side wall of the foundation element.

Another advantage is that, when the device, in particular the base frame, is in the open position, the device can easily be positioned by sliding it along the (curved) side wall of the foundation element until the foundation element is (partly) enclosed in the inner space. The device than only needs to be brought to the closed position in which the device is clamped around the foundation element.

Another advantage is that the device can be applied on board, particular on deck, of a ship, because it can directly be applied to a center or middle part of the foundation element. Therewith, it is obviated to apply the device onto the foundation element from an end thereof.

It is noted that the advantage also applied to foundation elements that are floating in the water, because the device can easily be lowered onto the foundation element and is guided into position along the side wall of the foundation element.

In an embodiment according to the invention, the base frame may comprise multiple non-curved ring-elements that together form the required curved shape.

In an embodiment according to the invention, the base frame may be substantially ring-shaped, and wherein the base frame may have a height that extends parallel to the central axis of the ring-shaped base frame.

An advantage of a ring-shaped base frame is that the inner space is substantially the same shape as the side wall circumference of the foundation element. In addition, due to the circular form of the outer wall of the ring-shape, the radial distance between the outer ring wall and the side wall of the foundation element is substantially equal at every point along the ring circumference. As a result, vibration elements (or groups thereof) can be positioned at equal distance to the side wall of the foundation element.

A further advantage is that, due to the ring-shape, the vibration forces can symmetrically be applied to the circumference of the foundation element.

Another advantage is that, especially due to the ring shape, the foundation element can easily be clamped in the inner space of the ring.

Yet another advantage is that the ring-shape can be manufactured and transported in a relatively easy manner.

An even further advantage of the ring-shape is that, especially with an electrical motor as drive or drive unit for the vibration elements, the amount of fatigue in the foundation element due to the vibrations is reduced with up to 25%.

In an embodiment according to the invention, the base frame comprises an inner space extending along a central axis and delineated by an inner wall and the base frame further comprises an outer wall having a polygonal shape, preferably a six-sided or eight-sided shape, along its circumference.

In an alternative embodiment, the base frame may have a polygonal outer wall having six or eight sides. An advantage of this embodiment is that, especially with six or eight vibration elements or groups of vibration elements, the groups can easily be positioned at equal distance from the side wall of the foundation element. In addition, an equidistant positioning of the (groups of) vibration elements along the circumference of the outer wall of the base frame is also relatively easy, because each vibration element (or group thereof) can be positioned at an associated side of the outer wall.

Moreover, the base frame may be provided with a polygonal inner wall that matches the polygonal outer wall. This can for example be embodied by a polygonal shape having a number of different parts that together form the polygonal shape.

In an embodiment according to the invention, the base frame, preferably an outer circumferential wall thereof, comprises a number of circumferential grooves, wherein the grooves are provided with a plurality of projections, preferably cylindrical projections that extend radially outward.

An advantage of this construction is that a plurality of vibration elements, preferably in the form of excenter blocks, can be positioned inside the base frame. This embodiment is in particular advantageous with a ring-shaped or polygonal base frame, since these have a suitable inner space between the inner wall and the outer wall.

Another advantage is that the plurality of vibration elements can be provided in groups, which may or may not be activated simultaneously. These groups may for example be provided in a circumferential direction (i.e. a group along the circumference) and/or along the longitudinal direction (i.e. parallel to the central axis of the ring/polygonal shape).

This positioning allows a more precise activation of the vibration elements and, thus provides an improved control over the vibrations imparted to the foundation element.

Furthermore, the grooves reduce the weight of the device, whereas the projections provide room between the inner and outer wall to position and operate the vibration elements.

In an elaboration of the abovementioned embodiment, the grooves, when viewed in a direction parallel to a central axis of the base frame, preferably have a height that is in the range of $\frac{1}{4}$ to $\frac{1}{2}$ of a base frame height, and preferably are about $\frac{1}{3}$ of the base frame height.

The grooves may essentially be provided with any height, yet the abovementioned range has proven to provide most effective in terms of material use and usability.

In an embodiment according to the invention, the base frame may comprise two or more parts, such as two half-ring parts, that are hingeably connected to each other, or wherein the base frame comprises a number of curved elements that are connectable to each other to form the ring-shaped base frame.

An advantage is that, by providing the base frame in two or more separate parts, the device can be easily positioned and secured around the foundation element. This allows the device to be placed on deck of a ship (in a marine environment) or after unloading on the ground (in a ground-based environment).

Another advantage is that applying the device according to the present invention on the foundation element can be performed without hindering the placement of the foundation element in a pile gripper. In some case, a pile gripper is used in marine applications to uphold and/or correct the vertical positioning of the foundation element. Such a pile gripper is a frame connected to the bow or deck of a ship and requires the foundation element to be moved into the frame during installation (and before upending). With the known devices, the device needs to be disconnected from the top end of the foundation element before this can be performed. This is obviated when using the device according to the invention, and especially with the abovementioned embodiment thereof. Therewith, this embodiment allows the installation and upending process to be sped up, which reduces costs.

A particular advantage of a hinge-based closure is that, due to the hinge or hinges, the device easily slides in place along the side wall of the foundation, after which it can be closed in a single move. This reduces the time to connect the device to the foundation element and therewith reduces costs.

A particular advantage of using a number of curved element is that, by varying the number of elements and/or the curvature thereof, the device can be used for foundation element with different diameters. It is preferred that, in this embodiment, each of the curved elements is a closed element having a space in which for example the vibration elements can be positioned. This allows the vibration elements to be positioned correctly at all times.

In an embodiment according to the invention, each of the half-ring parts comprise connection means that are configured to be mated to connect the half-ring parts with each other.

It is preferred that, when using a hingeable connection in the ring-shaped base frame, the other ends (i.e. the 'open' ends) are provided with connection means that allow the ring-shape to be closed. These connection means may for example comprise a nut-and-bolt connection, a slideable closure, and pin-and-hole connector or any other suitable connection means.

In an embodiment according to the invention, the device may comprise a plurality of vibration elements, wherein the vibration elements are positioned on or against an outer wall of the base frame or in the base frame between the inner wall and the outer wall.

An advantage of providing a plurality of vibration elements is that an improved control can be achieved over the induced vibrations. In one of the presently preferred embodiments four vibration elements are used.

Another advantage is that the vibration elements are independent from each other, which allows individual control over each one of the vibration elements. This means that during operation one or more of the plurality of vibration elements may selectively be used, whereas other of the plurality of vibration elements remains shut off.

Another advantage of the independence between the vibration elements of the plurality of vibration elements is that the reliability of the device is increased. If one or even several vibration elements are out of order, the remaining vibration elements can still be operated, and the insertion or removal of the foundation element can still proceed. In this respect, the device according to the invention differs significantly compared to the known devices in which all vibration elements are connected to each other and only operable as a single unit.

In an embodiment according to the invention, the device may comprise four vibration elements, wherein the vibration elements preferably are positioned substantially equidistant from each other on or against an outer wall of the base frame or in the base frame between the inner wall and the outer wall.

An advantage of positioning the vibration elements at equal distance from each other along the circumference of the base frame is that the vibration forces can symmetrically be applied to the circumference of the foundation element. It is also possible to provide a-symmetrical forces by selectively using some of the vibration elements.

Another advantage of the abovementioned positioning is that it allows a more precise activation of the vibration elements and, thus provides an improved control over the vibrations imparted to the foundation element. As a result, an improved control is achieved over both the axial and the torsional forces applied the foundation element.

In an embodiment according to the invention, the device may comprise a plurality of vibration elements, which are divided in a number of groups of vibration elements, wherein each of the groups of vibration elements is preferably positioned equidistant from each other on or against an outer wall of the base frame or in the base frame between the inner wall and the outer wall. More preferably, the number of groups is four or a multiple thereof, such as eight, sixteen, forty, four hundred.

An advantage of providing groups of vibration elements, that each comprise a number of vibration elements, is that an even more precise control can be obtained over the vibrational forces imparted to the foundation element. This is the result of the fact that each group imparts a predetermined force to the foundation element.

It is preferred that each group is separately controllable, which allows the forces to be adjusted to the specific requirement at a specific time during inserting. This for example allows generation of axial oscillating forces, torsional oscillating forces and combinations thereof. Furthermore, it allows the revolutions per minute (RPM) to be controlled for each group, which provides specific control of the abovementioned forces in even more detail.

In an embodiment according to the invention, the vibration device is configured to provide an axial vibration to a foundation element to insert the foundation element into the ground.

Due to the position of the base frame of the device on the foundation element, the vibration elements can be used to generate axial vibration, or more specifically axial oscillating forces, to the foundation element. Although this is also possible with the known devices, the efficiency with which the forces are transferred to the foundation element are significantly higher for the device according to the invention than for the known devices. This is inter alia the result of the proximity of the device near (or actually on) the side wall of the foundation element.

In an embodiment according to the invention, the vibration device is configured to provide torsional vibrations to a foundation element to insert the foundation element into the ground.

An advantage of the device according to the invention is that, alternative or additional to generating axial forces, the device is also capable of generating torsional vibrations or torsional oscillating forces.

It has been found that the foundation element can be inserted into the ground in a more efficient way using torsional vibrations. The device according to the invention is not only capable of generating such torsional vibrations, it is also capable of transferring these torsional vibrations with high efficiency to the foundation element during insertion thereof into the ground. Therewith, a more efficient insertion of the foundation element is achieved.

In addition, torsional vibrations have been found to be effective in removing foundation elements from the ground.

In a further embodiment according to the invention, the vibration device is configured to provide both axial vibration and torsional vibrations to a foundation element to insert the foundation element into the ground.

An advantage of applying both axial and torsional vibrations is that, especially when the combination of the ground composition and the foundation element induces high slide resistance, a high penetration depth of the foundation element can be achieved. This is achieved by the fact that the torsional vibrations reduce the slide resistance of the element, while the axial vibrations simultaneously help to insert the foundation element in the ground.

Conversely, the advantage also applies when removing a foundation element from the ground for similar reasons. The main difference is that the axial and/or torsional vibrations, in combination while a pull force by the crane, extract the element from the ground.

In an embodiment according to the invention, the device may further comprise at least one drive that is operatively connected to the base frame and that is configured to drive the at least one vibration element.

The at least one drive is preferably operatively connected to the base frame at a position near the base frame. This allows an efficient transfer of power from the at least one drive to the at least one vibration element. Preferably, the power transfer has only a few or no additional components, such as bearings or other transfer components. This reduces the amount of play and increases the efficiency of the vibration device.

In an embodiment according to the invention, the at least one drive is an electric motor, preferably a permanent magnet motor.

An advantage of an electric motor is that it substantially obviates the risk of pollution by hydraulic fluid leakage, because an electric motor does not require hydraulic fluid lines.

Another advantage is that an electric motor has an increased efficiency compared to a hydraulic drive, which reduces the carbon footprint of the operation to insert the foundation element using the device according to the invention.

Yet another advantage is that an electric motor, due to its characteristics, allows a more precise control over the vibration elements. This results in a more precise and local application of the vibrations and therewith to a more efficient inserting operation.

A further advantage is that the weight of an electric motor and the required electrical connections is much lower than the weight of a known hydraulic drive with the required hydraulic hoses. It is for example known that hydraulic hoses alone for known vibration devices weigh about 40 tonnes and that a hydraulic power unit requires about 8 shipping containers to house. An electric motor and the required electrical connections may reduce the size of the power unit with up to 70% and the weight with up to 75%. This is especially true in an embodiment in which the electric power may be obtained from renewable sources, such as (on-board) solar power and/or wind turbines in the direct vicinity of the working location.

In addition, an electric motor and the associated power system are much easier to scale, which is relevant in view of the increasing weight of the foundation elements. Currently, the weight of a typical foundation element is about 700-800 tonnes, whereas future weight are estimated to be in excess of 2,500 tonnes.

An advantage of a permanent-magnet motor is that it provides all the advantages of a regular electric motor and requires an even lower weight with a similar power output.

In an embodiment according to the invention, the at least one drive is connected to the base frame, preferably to an outer wall thereof, or is positioned inside the base frame between the inner wall and an outer wall thereof.

An advantage of connecting the at least one drive to the base frame is that the transfer of power from the drive to the vibration elements into the foundation element do not require bearings and/or other transfer components. This first of all means that the power produced in the at least one drive is effectively and substantially completely transferred to the at least vibration element. Secondly, the lack of bearings and other transfer components lead to a reduced play and, therewith, a reduced amount of wear and an increase of operational life-time of the vibration device. Preferably, the at least one drive is connected at the outer wall of the device and is in direct contact with the at least one vibration element to achieve the mentioned direct and efficient transfer of power.

In an embodiment according to the invention, the vibration device comprises a plurality of drives, wherein each drive of the plurality of drives is associated with a single vibration element, or with a group of vibration elements that are associated to each other, to drive the associated vibration element or associated group of vibration elements.

An advantage of providing a plurality of drives, each of which is associated with one or an associated group of vibration elements, is that each vibration element of group thereof can independently be controlled. This improves the overall control and additionally allows the vibrations to be provided from one or more specific directions. This is for example possible by activating two groups of vibration elements that are positioned in the device on opposite sides of the foundation element.

In an embodiment according to the invention, the device may further comprise at least two hoisting elements to which hoisting equipment, such as hoisting cables, are connectable, wherein the two hoisting elements are preferably positioned on opposite sides of an outer wall of the base frame.

An advantage of hoisting elements is that the hoisting elements can be connected to hoisting cable to allow a crane to hoist the foundation element into position.

In an embodiment according to the invention, the device may further comprise a control unit, wherein the control unit is configured to individually control each of the vibration elements or groups of vibration elements by controlling the drive associated with the vibration element or group of vibration elements.

An advantage of individually controlling the vibration elements or groups thereof is that the overall control over the direction and magnitude of vibrational forces is improved. Additionally, it allows the vibrations to be provided from one or more specific directions. This is for example possible by activating two groups of vibration elements that are positioned in the device on opposite sides of the foundation element.

In an embodiment according to the invention, the at least one drive and the at least one vibration element may be an integrated unit.

An advantage of providing an integrated unit is that it is more compact and, thus, easier to fit into the base frame.

Another advantage of the providing an integrated unit, especially when placed inside the base frame, is that the unit is substantially shielded from dirt, grit, water and/or other pollution.

In an embodiment according to the invention, the device may comprise clamping means that are configured to, in the closed position, clamp the foundation element in the inner space, and wherein the clamping means preferably are positioned at or at least partially in the inner wall or adjacent the inner wall in the inner space.

An advantage of separate clamping elements is that an additional clamping force can be provided that even more strongly secures the device on the foundation element to be inserted.

Another advantage of separate clamping elements is that, even when the inner space has a larger diameter than a foundation element that is enclosed therein, the device can be clamped around the foundation element. It is noted however that the device preferably fits as snugly as possible around the foundation element.

The clamping means may for example include one or more of a coating layer on the inner wall that provides an increased resistance against sliding or a separate layer of material that is provided on or against the inner wall to improve the sliding resistance.

In an embodiment according to the invention, the clamping means are moveable between a radially outwards position and a radially inwards position, wherein the clamping means are in the radially outwards position when the device is in the open position and wherein the clamping means are in the radially inwards position when the device is in the closed position.

An advantage of this embodiment is that the foundation element can be inserted in the device with relatively ease after which the foundation element can be clamped.

Preferably, the clamps are configured for clamping the foundation element, for example on a ship, and maintain the clamping position during upending and insertion of the foundation element into the ground. The clamps engage the foundation element such that the foundation element with the vibration device can be upended from the ship to the desired (vertical) location. At this location, and without changing the clamps, inserting the foundation element into the ground can be started. This obviates repositioning clamps and/or other parts of the vibration device when the foundation element is in a vertical position. This improves safety and efficiency of the process. Furthermore, in case the foundation element is transported on a ship, the correct clamping of the foundation element with the clamps of the vibration device can be easily checked. This further improves the overall safety of the process.

In an embodiment according to the invention, the device is configured to, during use, provide an orientation or heading force to rotate the foundation element around its longitudinal axis.

The orientation or heading of the foundation element during installation is increasingly important due to the fact that some facilities, such as electrical connections, are to be placed at a specific position or orientation. To achieve such a required orientation, the foundation element must be placed in a specific position, also called the heading or orientation. This may, for example be a connection of a wind turbine that, due to the location of the subsea grid, must be positioned in a north bound direction. The foundation element may be provided with means that facilitate a north-bound connection if the foundation element is positioned with the means facing north.

In known devices, the heading is often controlled by connecting two steering cables to opposite sides of the foundation element which allow the foundation element to be rotated around its longitudinal axis, a so-called angle-rotation, to achieve the correct heading. This is performed by tightening one cable, while simultaneously loosening the other. However, such actions often interfere with the vibration device, leading to problems with the orientation.

An advantage of the vibration device according to the invention is that it can, contrary to the known devices, be used to provide an orientation or heading force without the use of steering cables. This is due to the fact that the electric motor or motors allow the application of a temporal and specific vibration to the foundation element, which induces a rotation around its longitudinal axis or angle-rotation. This obviates the need for steering cables, which reduces complexity and weight of the device as well as the installation as a whole.

The precision and control over the rotation is even further increased due to the device being positioned at least partially around the side wall of the foundation element.

The precision and control over the rotation is also further increased if each drive or drives is associated with a single vibration element or a group of vibration elements.

In an embodiment according to the invention, the vibration device may be used to correct a vertical position of the foundation element, wherein the vertical position preferably is defined as an angle between the longitudinal axis of the foundation element and a substantially vertical line.

An advantage of the device according to the invention is that, due to the use of at least one electric motor, the vertical orientation of a foundation element can be corrected by providing a lateral force to foundation element. Such lateral force is a local, temporal lateral force and is generally induced by increasing the force on one side and/or decreasing the force on the opposite side of the foundation element. As a result, an offset in the vertical orientation can be corrected.

Another advantage is that a vertical orientation, especially a vertical off-set, can be regulated with a higher degree of precision than in existing devices. As a result, the foundation element can be more easily be positioned with a tolerance of less than 0.25 degrees.

In an embodiment according to the invention, the device may further comprise a control unit that is configured to control one or more of:

a tangential force exerted by the groups of vibration elements on the foundation element;

a horizontal force exerted by the groups of vibration elements on the foundation element;

an axial vibration, a torsional vibration and/or a combination of an axial and torsional vibration exerted by the groups of vibration elements on the foundation element;

a combination of one or more of a tangential force, a horizontal force, an axial vibration, a torsional vibration, a combination of an axial and torsional vibration and a heading and/or vertical inclination;

wherein the control is performed by controlling, by the control unit, one or more of:

an RPM of each electric motor;

a rotation of the electric phase of each electric motor between one or more electric motors of the plurality of electric motors;

an RPM of each of the excentre masses;

a timing phase of the rotation of each of the excentre masses, wherein the timing preferably comprises synchronous rotation, asynchronous rotation or time-shifted rotation; and/or a rotational speed of the excentre masses.

An advantage of the device according to the invention, especially in the abovementioned embodiment, is that it allows a high degree of control over the vibrations that are exerted on the foundation element during use. This is mainly due to the fact that controlling is performed by controlling a large number of different factors, each of which in turn influences the vibrational forces.

In an example, the number of RPM of each of the different vibration elements or groups thereof determines the force exerted on the foundation element (in the direction towards its longitudinal axis). If the number of RPM of different groups (or single elements) differs, than a shift in the resulting force is achieved, which be used to direct the foundation element during insertion. A similar reasoning is valid for the other control steps.

As a result, it becomes possible to, with a high degree of precision, control the axial and/or torsional forces, and also control the heading and/or vertical inclination of the foundation element. Such a high degree of control is not possible with the existing methods.

The high degree of control precision is mainly achieved by virtue of the proximity of the device near the side wall of the foundation element and the fact that the device is positioned substantially against the side wall. This allows a precise, directional force to be applied using the vibration elements, which in turn results in precise corrections of the foundation element during insertion. This may for example be a correction in the vertical inclination (the angle of the longitudinal axis of the foundation element to a vertical line) or the correction of a heading (a specific direction of a point or (vertical) line on the side wall of the foundation element.

The invention further relates to a vibration system, the system comprising:

a vibration device according to the invention; and a power supply that is operatively connected to the vibration device.

The vibration system according to the invention provides similar effects and advantages as described for the vibration device according to the invention. It is furthermore noted that the vibration device according to the invention can freely be combined with one or more of the embodiments as well as combinations thereof as described for the vibration device according to the invention.

The invention further relates to a vibration assembly, the assembly comprising:

a vibration device according to the invention or a vibration system according to the invention; and at least one foundation element.

The vibration assembly according to the invention provides similar effects and advantages as described for the vibration device and the vibration system according to the invention. It is furthermore noted that the vibration device according to the invention can freely be combined with one or more of the embodiments as well as combinations thereof as described for the vibration device and the vibration system according to the invention.

In an embodiment of the vibration assembly according to the invention, the at least one foundation element comprises a lower end that is configured to be inserted into the ground, wherein the lower end is a profiled end, and preferably wherein the profiled end is one of a saw tooth profile, a pointed profile or another non-flat profile.

An advantage of providing a profiled lower end, especially having one of the mentioned preferred profiles, is that the sliding or toe resistance of the foundation element in the ground is further reduced, especially when subjected to at least torsional vibrations, which reduces the amount of vibration force required to insert the foundation element into the ground.

Another advantage is that the insertion speed and/or the insertion depth are increased due to the decreased resistance.

The invention further relates to an assembly of a ship with a vibration device according to the invention, a vibration system according to the invention or a vibration assembly according to the invention.

The assembly according to the invention provides similar effects and advantages as described for the vibration device, the vibration system and the vibration assembly according to the invention. It is furthermore noted that the vibration device according to the invention can freely be combined with one or more of the embodiments as well as combinations thereof as described for the vibration device, the vibration system and the vibration assembly according to the invention.

The invention also relates to a method for inserting a foundation element into the ground, the method comprising the steps of:

providing a vibration device or a vibration system according to the invention; and using the device or the system to drive a foundation element into the ground.

The method according to the invention provides similar effects and advantages as described for the vibration device, the vibration system and the vibration assembly according to the invention. It is furthermore noted that the method according to the invention can freely be combined with one or more of the embodiments as well as combinations thereof as described for the vibration device, the vibration system and the vibration assembly according to the invention.

In an embodiment of the method, the step of using the device or system may comprise:

positioning the vibration device around a foundation element;

securing the vibration device to the foundation element; and driving the foundation element into the ground.

In an embodiment of the method, the method may additionally comprise the step of upending the foundation element before driving the foundation element into the ground.

In one of the presently preferred embodiments of the invention the method further comprises the step of clamping the foundation element with the clamps and maintaining the clamping position during upending and insertion of the foundation element into the ground. The clamps engage the foundation element such that the foundation element with the vibration device can be upended from the ship to the desired (vertical) location. At this location, and without changing the clamps, inserting the foundation element into the ground can be started. This provides the advantages as described in relation to the device.

In an embodiment of the method, the vibration device may comprise two or more parts that are hingeably connected to each other, and the method may additionally comprise the steps of:

opening the vibration device by hinging the two or more parts apart;

positioning, preferably by sliding, the device on the foundation element;

closing the two or more parts such that the device encloses the foundation element; and securing the vibration device to the foundation element by locking the two or more parts together.

An advantage of this embodiment is that, in the open position, sliding the device over and along the (curved) side wall of the foundation element is easy and ensures that the foundation element is (at least partly) enclosed in the inner space. The step of closing the device is than a relatively easy step to perform, especially considering the fact that the steps of positioning and closing the device can be performed on deck of a ship, rather than outside the deck over and/or in the open sea.

It is noted that the advantage also applied to foundation elements that are floating in the water, because the device can easily be lowered onto the foundation element and is guided into position along the side wall of the foundation element.

In an embodiment of the method, the vibration device may comprise a plurality of electric motors, wherein each electric motor of the plurality of electric motors is associated with a single vibration element, or with a group of vibration elements that are associated to each other, to drive the associated vibration element or associated group of vibration elements.

An advantage of providing a plurality of drives, each of which is associated with one or an associated group of vibration elements, is that each vibration element of group thereof can independently be controlled. This improves the overall control and additionally allows the vibrations to be provided from one or more specific directions. This is for example possible by activating two groups of vibration elements that are positioned in the device on opposite sides of the foundation element.

In an embodiment of the method, each vibration element is an excentre mass, and the method may further comprise one or more of the steps of controlling, with a control unit:

a tangential force exerted by the groups of vibration elements on the foundation element;

a horizontal force exerted by the groups of vibration elements on the foundation element; and/or an axial vibration, a torsional vibration and/or a combination of an axial and torsional vibration exerted by the groups of vibration elements on the foundation element; or a combination of one or more of a tangential force, a horizontal force, an axial vibration, a torsional vibration, a combination of an axial and torsional vibration and a heading and/or vertical inclination;

wherein the steps of controlling are preferably performed by controlling, by the control unit, one or more of:

a number of RPM of each electric motor;

a rotation of the electric phase of each electric motor between one or more electric motors of the plurality of electric motors;

a number of RPM of each of the excentre masses;

a timing phase of the rotation of each of the excentre masses, wherein the timing preferably comprises synchronous rotation, asynchronous rotation or time-shifted rotation; and/or a rotational speed of the excentre masses.

The method according to the invention, especially in the abovementioned embodiment, allows a high degree of control over the vibrations that are exerted on the foundation element during use. This is mainly due to the fact that controlling is performed by controlling a large number of different factors, each of which in turn influences the vibrational forces.

In an example, the number of RPM of each of the different vibration elements or groups thereof determines the force exerted on the foundation element (in the direction towards its longitudinal axis). If the number of RPM of different groups (or single elements) differs, than a shift in the resulting force is achieved, which be used to direct the foundation element during insertion. A similar reasoning is valid for the other control steps.

As a result, it becomes possible to, with a high degree of precision, control the axial and/or torsional forces, and also control the heading and/or vertical inclination of the foundation element. Such a high degree of control is not possible with the existing methods.

Further advantages, features and details of the invention are elucidated on the basis of preferred embodiments thereof, wherein reference is made to the accompanying drawings, in which:

FIG. 5 shows the example of the vibration device of FIG. 3 with the foundation element in an upright, or up-ended position;

FIG. 8 shows an example of the method according to the invention.

Figures 1, 2:
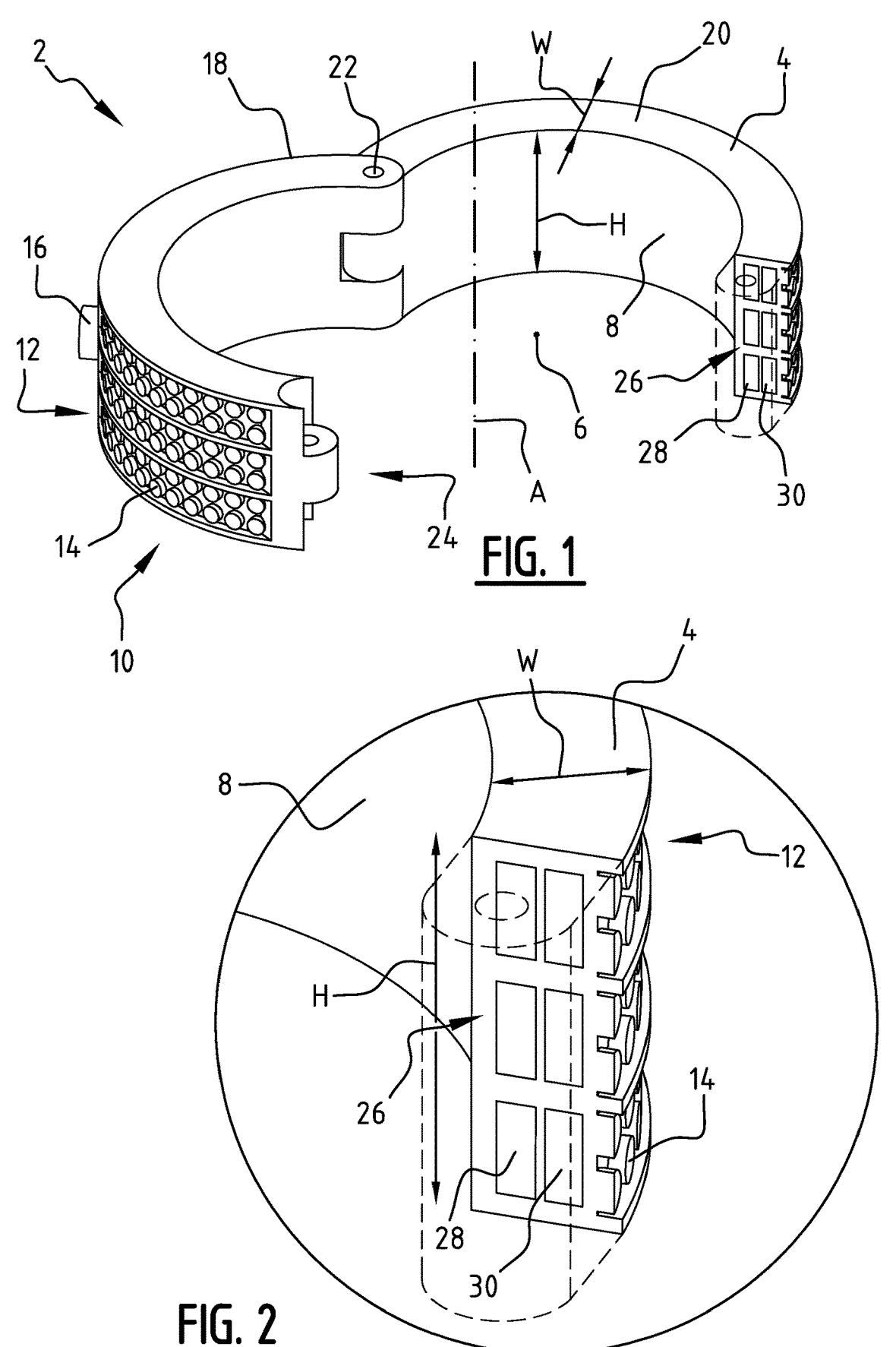
FIG. 1 shows a perspective view of an example of the vibration device according to the invention.
FIG. 2 shows a detailed cross-sectional view of the example of FIG. 1.

In an example of vibration device according the invention (see FIGS. 1, 2), vibration device 2 in this example has the form of a ring. Vibration device 2 comprises ring-shaped base frame 4 having inner space 6 that is delineated by inner wall 8 and that extends over height H. Base frame 4 further comprises outer wall 10, which is radially spaced outwards from inner wall 8, when viewed radially outwards from central axis A of vibration device 2. In this example, the distance between inner wall 8 and outer wall 10 defines width W of vibration device 2.

In this example (see FIG. 1), outer wall 10 comprises three substantially circumferential grooves 12 that are positioned above each other when viewed in first direction x that is parallel to central axis A and height direction H. Each groove 12 is provided with a number of projections 14 that extend radially outward from the groove 12 in which the projection 14 is positioned. Outer wall 10 is further provided with hoisting elements 16 that are positioned on opposite sides of outer wall 10 and that are configured for connecting hoisting equipment, such as hoisting cables (not shown).

In this particular example, base frame 4 is provided as two halves 18, 20, which are connected to each other by hinge 22. Base frame 4 is provided with connection means 24 on the opposite of hinge 22. In this example, connection means 24 comprises pen-and-hole connection 24 (of which the pen is not shown).

In this example, a number of vibration elements 28 and a number of drives 30, in this case three vibration elements 28 and three drives 30 are shown in the inner space 26 of base frame 4 (see also FIG. 2).

Figures 3, 4:
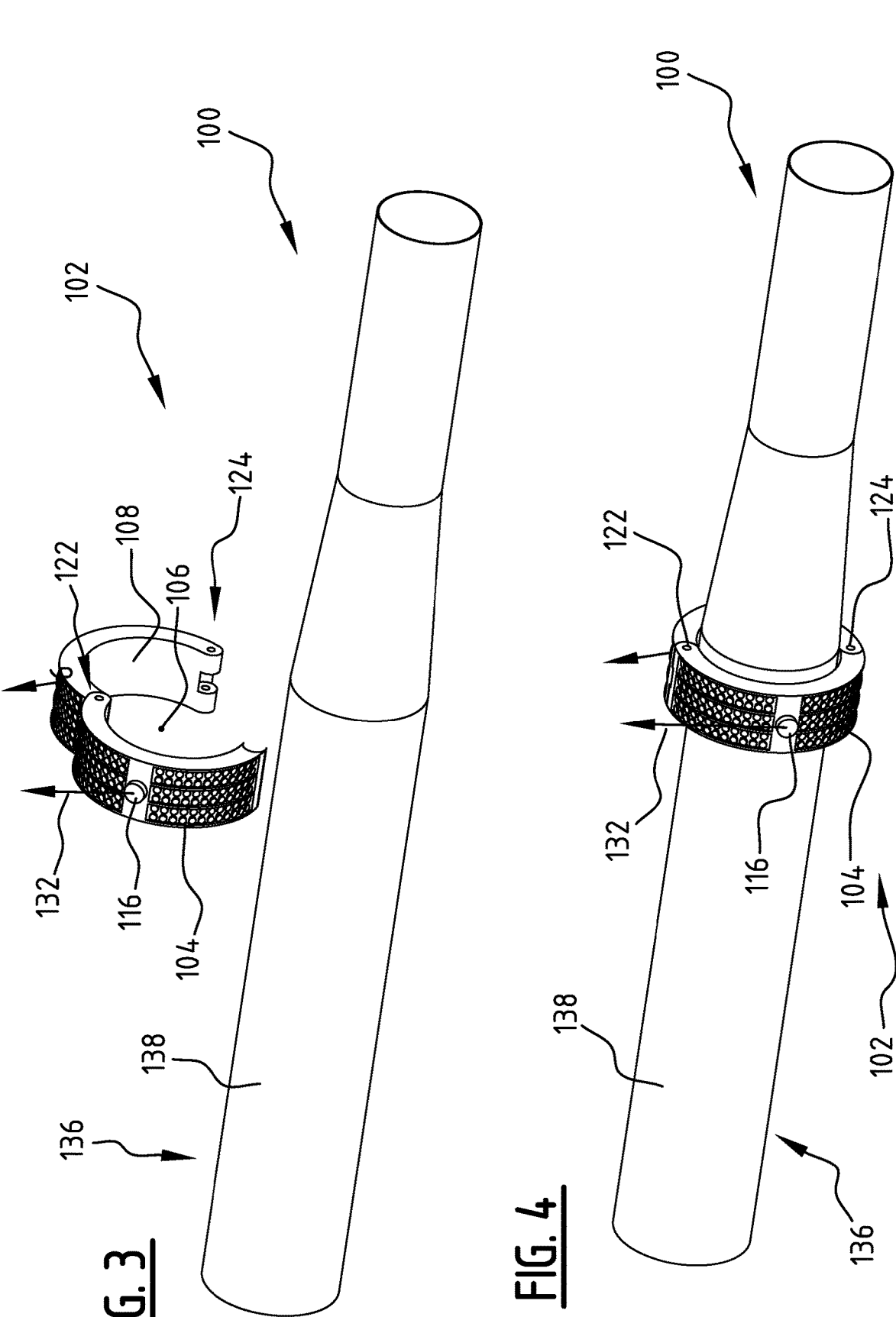
FIG. 3 shows an example of a vibration device according to the invention directly prior to connecting the device with a foundation element.
FIG. 4 shows the example of the vibration device of FIG. 3, when connected to the foundation element.

In an example (see FIGS. 3-5), vibration device 102 is part of vibration assembly 100, which comprises vibration device 102 and foundation element 136. Vibration device 102 is positioned adjacent foundation element 136 (see FIG. 3) before being positioned thereon. Connection means 124 are unconnected and hinge 122 is open to allow vibration device 102 to be positioned around side wall 138 of foundation element 136. Hoisting elements 116 are in this example already loosely connected to hoisting cables 132. After positioning vibration device 102, vibration device 102 is closed and secured (see FIG. 4). Connection element 124 is closed and secured and inner wall 106 is positioned against side wall 138 of foundation element 136. In FIG. 5, foundation element 136 is positioned upright and connected, in this case suspended on, hoisting cables 132 which are connected to hoisting elements 116.

In an example of vibration device 2, 102, 202, several modes of operation are schematically shown (see FIG. 6A-6F) in which four groups of vibration elements, in this case excentre masses, are used. These excentre masses are positioned equidistant around a circumference of vibration device 2, 102, 202.

Figures 6A, 6B, 6C, 6D, 6E, 6F:
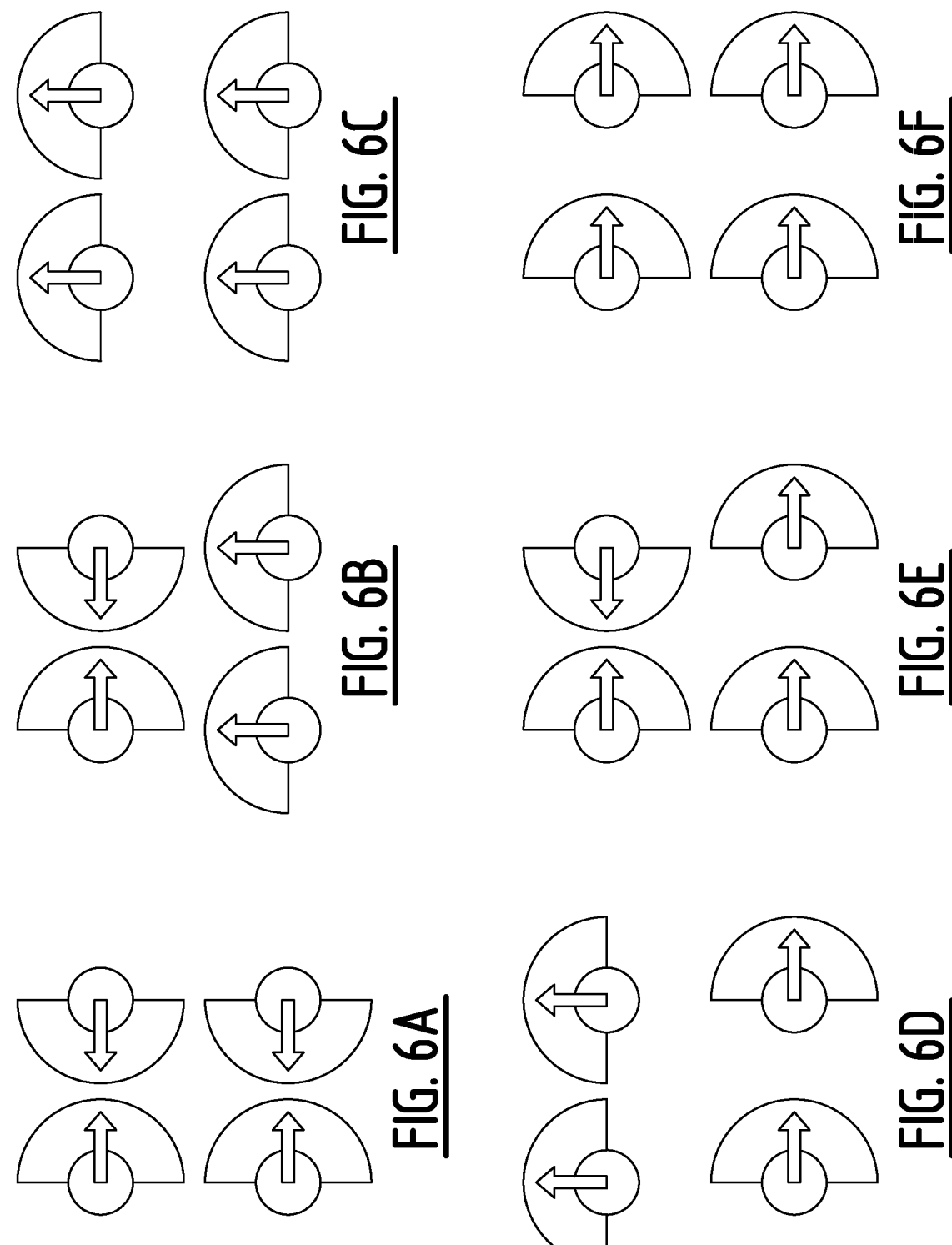
FIGS. 6A-6F show various examples of drive modes for an example of the vibration device according to the invention.
Figure 7A:
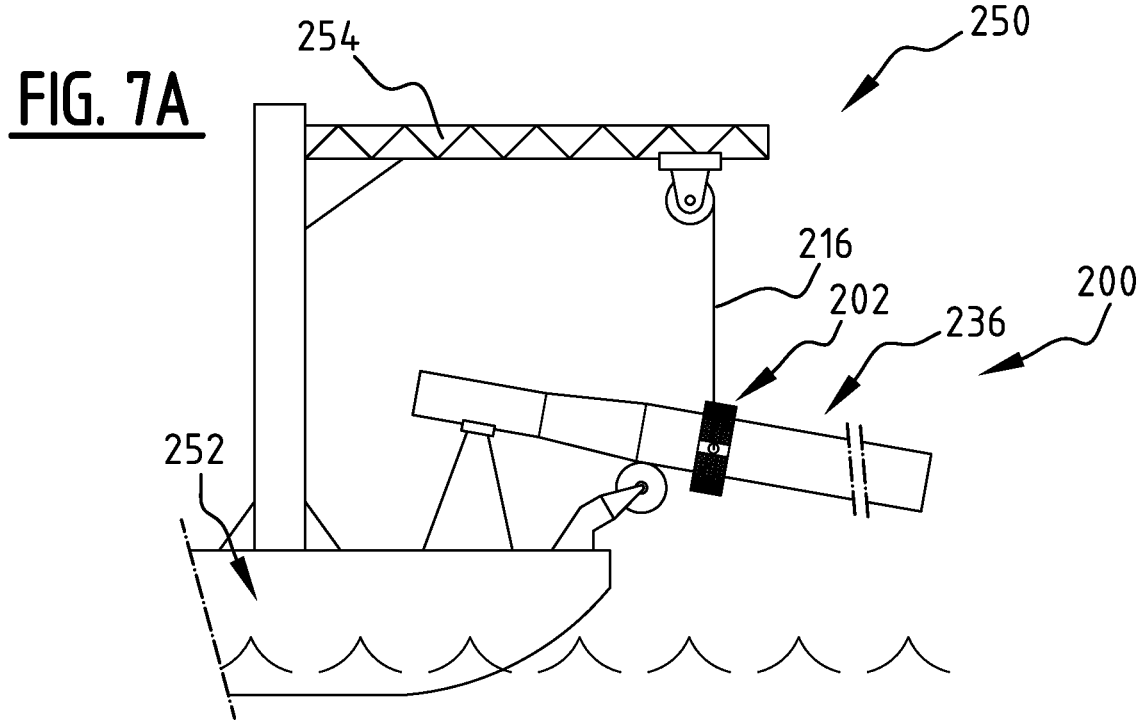
FIG. 7A-7D show a schematic overview of upending a foundation element using a device according to the invention.
Figure 7B:
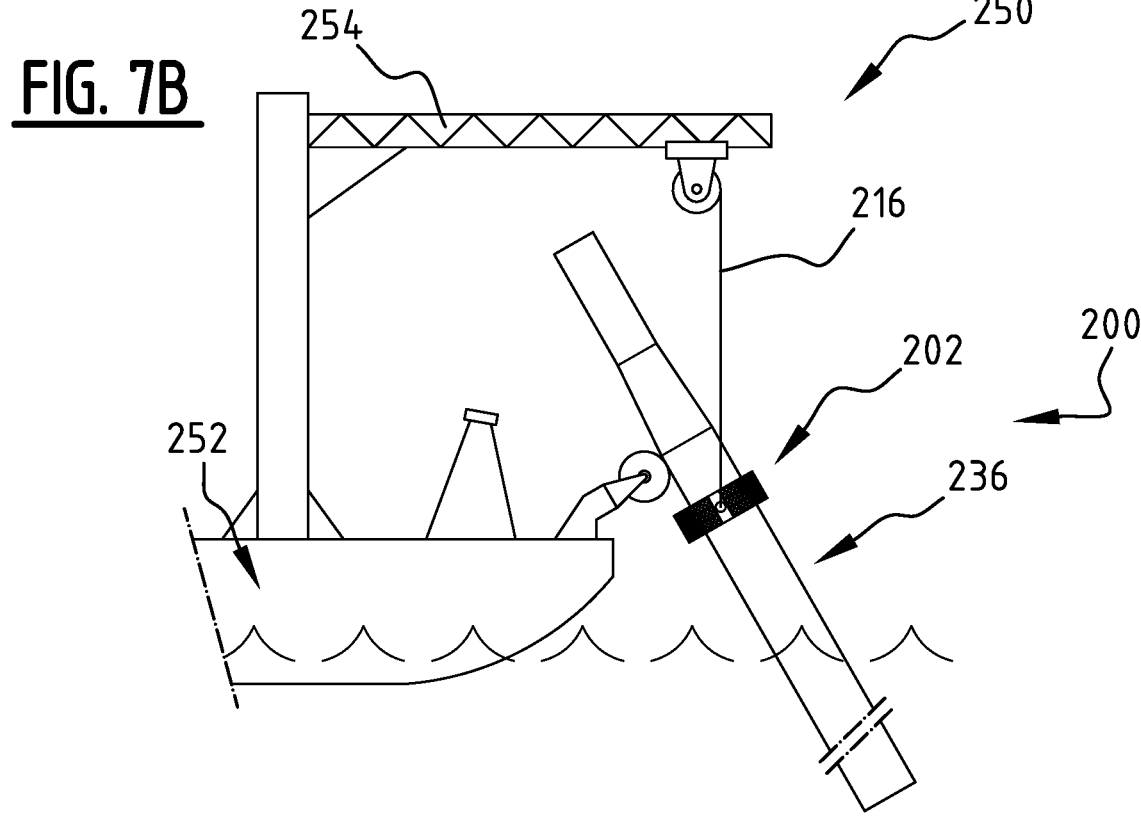
Figure 7C:
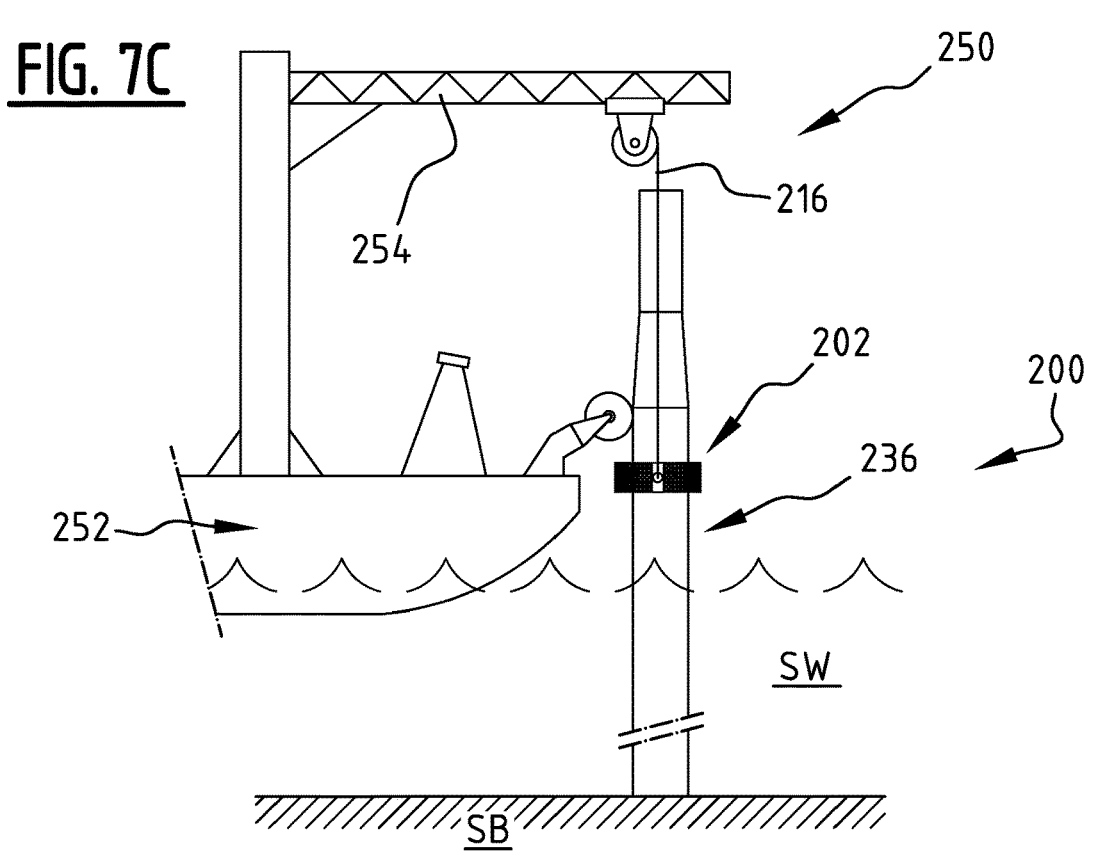
Figure 7D:
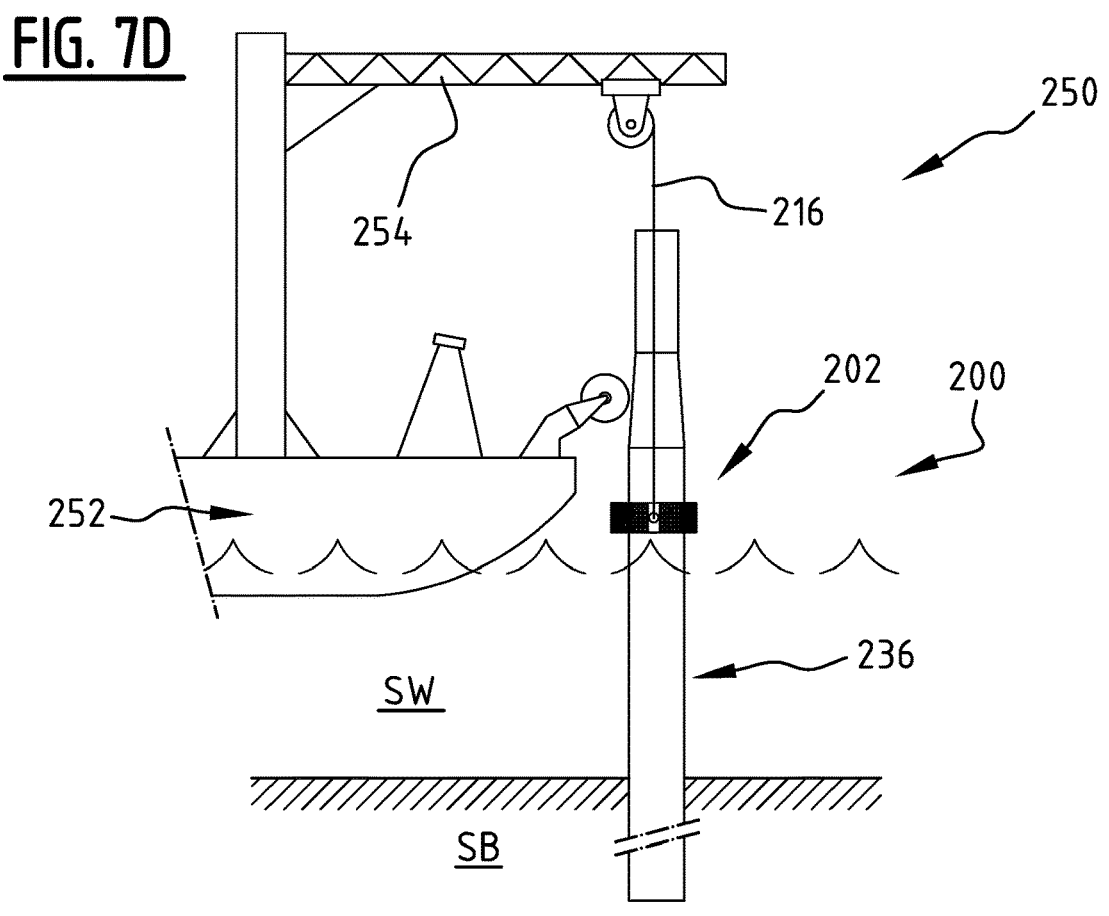

In FIG. 6A, the amplitude of all vibration elements is equal and the direction of oppositely placed vibration elements is opposite to each other. This leads to a net vibration force of zero on the foundation element. In FIG. 6B, two of the vibration elements have a equal and opposite directed forces (see the two vibration elements depicted at the top) and thus produce a net vibration force of zero. The other two elements (depicted at the bottom of FIG. 6B) both provide a vertically directed vibrational force, which equals 50% of the total amplitude that can be achieved using the vibration device according to the invention. In FIG. 6C, all vibration elements provide a vertically oriented force, which results in a maximum vertically directed vibrational force to the foundation element. That is, with an amplitude of 100%. This is mainly due to the fact that the forces are all synchronous, and thus amplify each other. FIG. 6D shows a combination of a vertically directed vibrational force (by the two vibration elements depicted above) and a torsional force that is caused by the two vibration elements depicted below. These are both directed to one side and are similar in timing, thus resulting in a torsional vibration. In this specific example, 50% of the maximum vibrational force is achieved in a vertical direction and 50% of the maximum vibrational force is directed in a torsional direction. In FIG. 6E, the vibration elements are provided such that the vertical vibrational force is zero, whereas there is a torsional force. FIG. 6F shows a zero vertically oriented force and a maximum torsional force due to the simultaneous movement of all vibration elements in the same direction (and with the same timing).

This example (see FIGS. 6A-6F) therewith show that the vibration device according to the invention can be used to provide a high degree of control over the vibrational forces applied to the foundation element that is to be placed. As a result, the efficiency is increased, whereas the energy and time consumption are decreased compared to the known devices.

In an example, assembly 250 of ship 252 and assembly 200 is shown. In this example (see FIGS. 7A-7D), the process of upending foundation element 236 is shown using vibration device 202 and, in this example crane 254. Foundation element 236 is slowly put in a vertical position, which is called upending, while being suspended on hoisting cables 216 that are connected to vibration device 202. During positioning, foundation element 236 slowly moves from a substantially horizontal position to a substantially vertical position in which foundation element 236 can be inserted in seabed SB. In this example, vibration device 202 is, during operation, above the sea SW, although it is well possible that in other examples, vibration device 202 is positioned below sea level of sea SW. In this illustrated embodiment the clamps need not to be repositioned and the clamps can be maintained in their position during the initial clamping, upending and inserting of the foundation element in the seabed.

In a schematic example of method 1000 (FIG. 8), method 1000 comprises the steps of providing 1002 a vibration device or a vibration system according to the invention and using 1004 the device or the system to drive a foundation element into the ground.

Optionally, method 1000 may comprise the step of upending 1010 the foundation element before driving the foundation element into the ground.

Further optionally, each vibration element of a vibration device according to the invention, such as vibration device 2, 102, 202, may be an excentre mass, and method 1000 may comprise one or more of the steps of controlling 1016 with a control unit:

a tangential force exerted by the groups of vibration elements on the foundation element;

a horizontal force exerted by the groups of vibration elements on the foundation element; and/or an axial vibration, a torsional vibration and/or a combination of an axial and torsional vibration exerted by the groups of vibration elements on the foundation element;

a heading and/or vertical inclination of the foundation element; or a combination of one or more of a tangential force, a horizontal force, an axial vibration, a torsional vibration, a combination of an axial and torsional vibration and a heading and/or vertical inclination;

wherein the one or more steps of controlling 1016 are preferably performed by controlling, by the control unit, one or more of:

a number RPM of each electric motor;

a rotation of the electric phase of each electric motor between one or more electric motors of the plurality of electric motors;

a number RPM of each of the excentre masses;

a timing phase of the rotation of each of the excentre masses, wherein the timing preferably comprises synchronous rotation, asynchronous rotation or time-shifted rotation; and/or a rotational speed of the excentre masses.

The step of using 1004 the device or the system to drive a foundation element into the ground may comprise the (sub)steps of positioning 1006 the vibration device around a foundation element, securing 1008 the vibration device to the foundation element, and then driving 1004 the foundation element into the ground.

The step of using 1004 the device or the system to drive a foundation element into the ground may additionally or optionally also comprise the (sub)steps of opening 1012 the vibration device by hinging the two or more parts apart, than the sub-step of positioning 1006, preferably by sliding, the device on the foundation element, followed by closing 1014 the two or more parts such that the device encloses the foundation element. After closing 1014, the steps comprise securing 1008 the vibration device to the foundation element by locking the two or more parts together and driving 1004 the foundation element into the ground.

The present invention is by no means limited to the above described preferred embodiments and/or experiments thereof. The rights sought are defined by the following clauses within the scope of which many modifications can be envisaged.

The invention claimed is:

1. A vibration device for inserting a foundation element into the ground, the device comprising:

a base frame having an inner space; and two or more vibration elements that are connected to the base frame;

wherein, during use, the base frame extends at least partly around a side wall of the foundation element to at least partially enclose said foundation element in the inner space; and wherein the base frame has an inner wall that delineates the inner space, and wherein the inner wall, during use, extends parallel to the outer wall of the foundation element, characterized in that the base frame has an open position in which the device is positionable around the foundation element, and has a closed position in which the foundation element is clamped in the inner space of the base frame, wherein the base frame is substantially ring-shaped, further comprising at least one drive that is operatively connected to the base frame and that is configured to drive the two or more vibration elements, wherein the device comprises clamping means that are configured to, in the closed position, clamp the foundation element in the inner space.

2. The vibration device according to claim 1, wherein the inner wall, during use, also extends contiguous with the outer wall of the foundation element.

3. The vibration device according to claim 1, wherein the base frame has a height that extends parallel to the central axis of the ring-shaped base frame, wherein base frame comprises two or more parts that are hingeably connected to each other, or wherein the base frame comprises a number of curved elements, that are connectable to each other to form the ring-shaped base frame.

4. The vibration device according to claim 1, wherein the device comprises two or more vibration elements, and wherein the vibration elements are positioned substantially equidistant from each other on or against an outer wall of the base frame or in the base frame between the inner wall and the outer wall.

5. The vibration device according to claim 1, wherein the at least one drive is an electric motor comprising a permanent-magnet motor.

6. The vibration device according to claim 1, further comprising a plurality of vibration elements or a number of groups of vibration elements, wherein the vibration device further comprises a control unit, wherein the control unit is configured to individually control each of the vibration elements or groups of vibration elements by controlling the drive associated with the vibration element or group of vibration elements.

7. The vibration device according to claim 1, further comprising at least two hoisting elements to which hoisting equipment, such as hoisting cables, are connectable, wherein at least the two hoisting elements are positioned on opposite sides of an outer wall of the base frame.

8. The vibration device according to claim 1, wherein the clamping means are positioned at or at least partially in the inner wall or adjacent the inner wall in the inner space.

9. The vibration device according to claim 8, wherein the vibration elements, the inner wall and the clamping means are directly connected to each other, and wherein the vibration elements, the inner wall, and the clamping means are at least partially integrated with other.

10. The vibration device according to claim 8, wherein the clamps are configured for clamping the foundation element, and maintaining the clamping position during upending and insertion of the foundation element into the ground.

11. A vibration assembly comprising:
a vibration device comprising:
a base frame having an inner space;
two or more vibration elements that are connected to the base frame;
wherein, during use, the base frame extends at least partly around a side wall of the foundation element to at least partially enclose said foundation element in the inner space; and
wherein the base frame has an inner wall that delineates the inner space, and wherein the inner wall, during use, extends parallel to the outer wall of the foundation element, characterized in that the base frame has an open position in which the device is positionable around the foundation element, and has a closed position in which the foundation element is clamped in the inner space of the base frame, wherein the base frame is substantially ring-shaped, further comprising at least one drive that is operatively connected to the base frame and that is configured to drive the two or more vibration elements, wherein the device comprises clamping means that are configured to, in the closed position, clamp the foundation element in the inner space; and
at least one foundation element.

12. A method for inserting a foundation element into the ground or extracting a foundation element from the ground, the method comprising the steps of:
providing a vibration device comprising:
a base frame having an inner space;
two or more vibration elements that are connected to the base frame;
wherein, during use, the base frame extends at least partly around a side wall of the foundation element to at least partially enclose said foundation element in the inner space; and
wherein the base frame has an inner wall that delineates the inner space, and wherein the inner wall, during use, extends parallel to the outer wall of the foundation element, characterized in that the base frame has an open position in which the device is positionable around the foundation element, and has a closed position in which the foundation element is clamped in the inner space of the base frame, wherein the base frame is substantially ring-shaped, further comprising at least one drive that is operatively connected to the base frame and that is configured to drive the two or more vibration elements, wherein the device comprises clamping means that are configured to, in the closed position, clamp the foundation element in the inner space; and
using the device or the system to drive a foundation element into the ground, or alternatively using the device or the system to extract a foundation element from the ground.

13. The method according to claim 12, wherein the step of using the device or system comprises:
positioning the vibration device around a foundation element;
securing the vibration device to the foundation element; and
driving the foundation element into the ground, or alternatively extracting the foundation element from the ground.

14. The method according to claim 13, additionally comprising the step of upending the foundation element before driving the foundation element into the ground, and further comprising the step of clamping the foundation element with the clamps and maintaining the clamping position during upending and insertion of the foundation element into the ground.

15. The method according to claim 12, wherein the vibration device comprises two or more parts that are hingeably connected to each other, and wherein the method additionally comprises the steps of:
opening the vibration device by hinging the two or more parts apart;

positioning, by sliding, the device on the foundation element;

closing the two or more parts such that the device encloses the foundation element; and securing the vibration device to the foundation element by locking the two or more parts together.

16. The method according to claim 12, wherein the vibration device comprises a plurality of electric motors, wherein each electric motor of the plurality of electric motors is associated with a single vibration element, or with a group of vibration elements that are associated to each other, to drive the associated vibration element or associated group of vibration elements.

17. The method according to claim 16, wherein each vibration element is an excentre mass, the method further comprising one or more of the steps of controlling, with a control unit:

a tangential force exerted by the groups of vibration elements on the foundation element;

a horizontal force exerted by the groups of vibration elements on the foundation element; and/or an axial vibration, a torsional vibration and/or a combination of an axial and torsional vibration exerted by the groups of vibration elements on the foundation element;

a heading and/or vertical inclination of the foundation element; or a combination of one or more of a tangential force, a horizontal force, an axial vibration, a torsional vibration, a combination of an axial and torsional vibration and a heading and/or vertical inclination;

wherein the steps of controlling are performed by controlling, by the control unit, one or more of:

a number RPM of each electric motor;

a rotation of the electric phase of each electric motor between one or more electric motors of the plurality of electric motors;

a number RPM of each of the excentre masses;

a timing phase of the rotation of each of the excentre masses, wherein the timing comprises synchronous rotation, asynchronous rotation, or time-shifted rotation; and/or a rotational speed of the excentre masses.

18. The method according to claim 12, wherein the at least one foundation element comprises a profiled end, and wherein the step of using the device or the system comprises applying at least torsional vibrations to the at least one foundation element.

\* \* \* \* \*